United States Patent [19]

Thomann et al.

[11] E Patent Number: Re. 33,439

[45] Reissued Date of Patent: Nov. 13, 1990

[54] DRAINAGE CHANNEL WITH LOCKING GRATE

[75] Inventors: Roland Thomann, Langnau; Heinz Witschi, Adligenswil; Heinz-Dieter Brink, Mattstetten; Markus Amann, Langnau, all of Switzerland

[73] Assignee: Abt, Inc., Troutman, N.C.

[21] Appl. No.: 160,331

[22] Filed: Feb. 25, 1988

Related U.S. Patent Documents

Reissue of:

[64] Patent No.: 4,630,962
Issued: Dec. 23, 1986
Appl. No.: 766,088
Filed: Aug. 16, 1985

U.S. Applications:

[63] Continuation of Ser. No. 506,245, Jun. 20, 1983, abandoned.

[30] Foreign Application Priority Data

Nov. 23, 1982 [CH] Switzerland ..... 6826/82

[51] Int. Cl.[5] ..... E01F 5/00

[52] U.S. Cl. ..... 404/2; 404/4; 52/169.5; 210/163

[58] Field of Search ..... 404/2-5, 404/25; 52/169.5, 177, 180, 181, 662, 667; 210/163, 164, 166; 405/36, 43, 119; 264/31, 35; 249/1, 2, 8, 10, 11, 189; 49/41, 465; 292/256, 73, 260

[56] References Cited

U.S. PATENT DOCUMENTS

| | | | |
|---|---|---|---|
| 1,060,693 | 5/1913 | Mueller | 292/260 X |
| 1,324,981 | 12/1919 | Roesch | 292/260 |
| 1,458,391 | 6/1923 | Burton | 404/25 X |
| 2,312,155 | 2/1943 | Flaxman | 404/25 X |
| 3,319,384 | 5/1967 | Berg | 52/710 X |
| 3,418,781 | 12/1968 | Penote | 52/704 |
| 3,561,307 | 2/1971 | Mortensen | 52/707 X |
| 3,860,089 | 1/1975 | Huggett | 52/710 X |
| 4,472,078 | 9/1984 | Karbstein | 404/2 |
| 4,498,807 | 2/1985 | Kirkpatrick et al. | 404/4 X |
| 4,560,009 | 12/1985 | Lindbeck | 172/66 |
| 4,640,643 | 2/1987 | Williams | 404/4 |

FOREIGN PATENT DOCUMENTS

| | | | |
|---|---|---|---|
| 81741 | 6/1983 | European Pat. Off. | 404/4 |
| 112287 | 6/1984 | European Pat. Off. . | |
| 2844748 | 4/1979 | Fed. Rep. of Germany | 210/163 |
| 1430358 | 1/1966 | France . | |
| 20789 | of 1903 | United Kingdom | 404/2 |

OTHER PUBLICATIONS

Polydrain, Inc. "Surface Drainage Made Sample", brochure, 9-83, p. 3.

*Primary Examiner*—Jerome W. Massie
*Assistant Examiner*—Matthew Smith
*Attorney, Agent, or Firm*—W. Thad Adams, III

[57] ABSTRACT

A slotted grate (2) is provided for being positioned in and covering the opening of the channel body (1) of a drainage channel. Anchor means are provided for detachably securing grate (2) to channel body (1) and include a bolt (4) rotatably mounted on grate (2) and having an end (14) extending into channel body (1). A locking strap (5) is carried transversely by bolt (4) for rotation within channel body (1) into and out of proximity to the walls (7,7') of channel body (1). Locking blocks (8, 8') are carried by walls (7,7') and secure locking strap (5) within locking blocks (8,8') upon rotation of locking strap (5) in one direction, and permit detachment of locking strap (5) upon rotation of locking block (5) in the other direction. Therefore, grate (2) can be easily and quickly secured to or detached from channel body (1), as desired.

9 Claims, 2 Drawing Sheets

FIG. 1
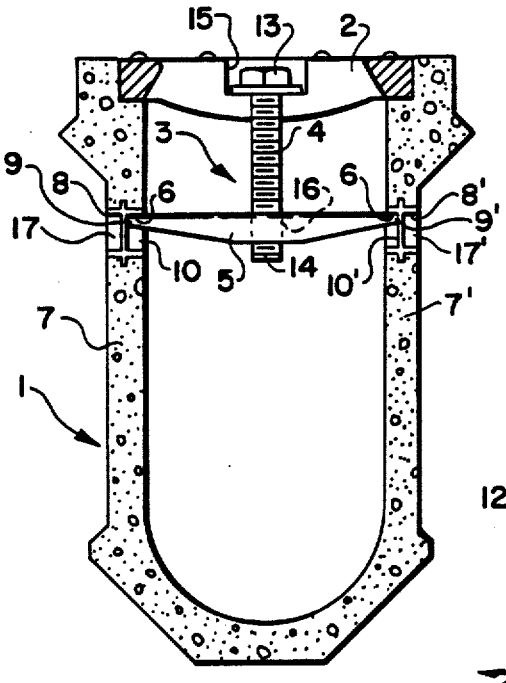
FIG. 2
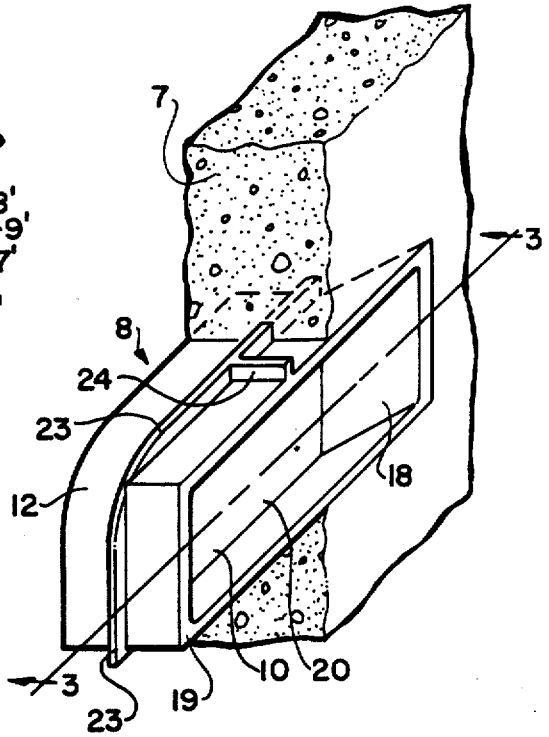
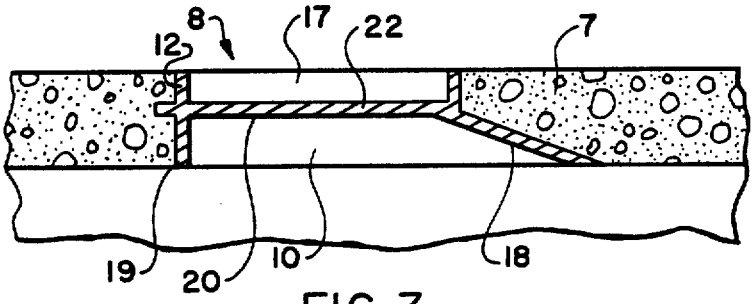
FIG. 3

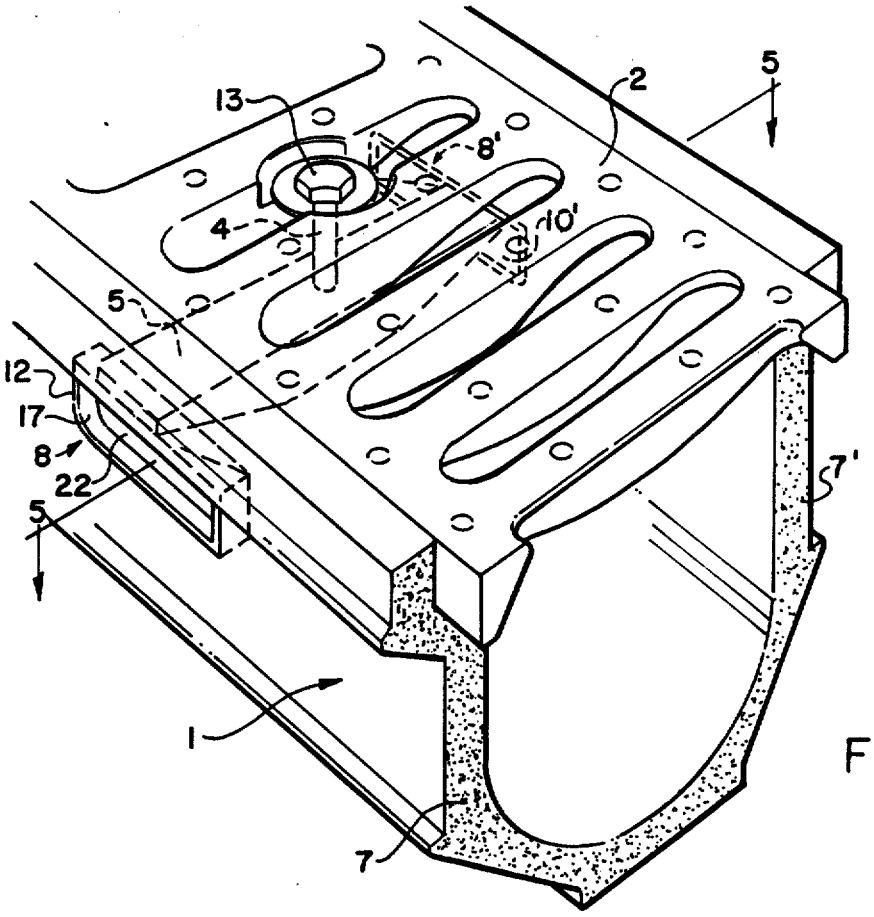
FIG. 4
FIG 5
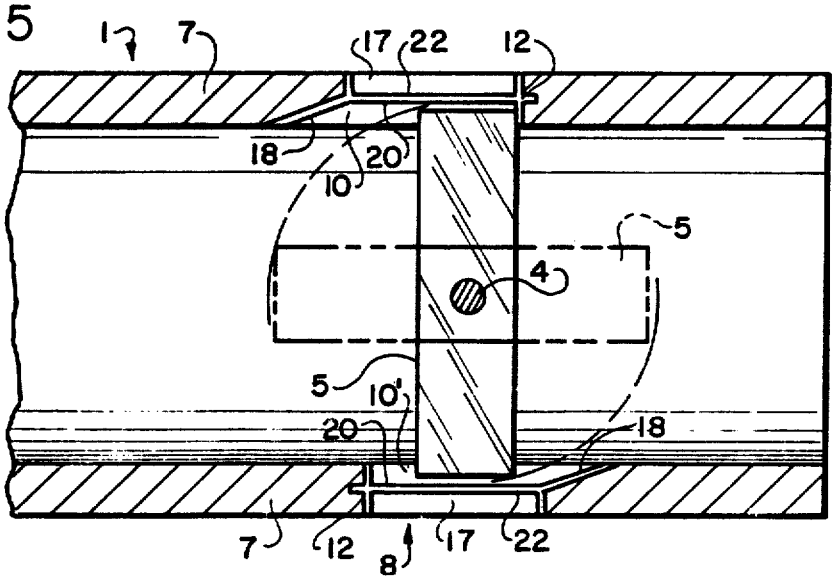

DRAINAGE CHANNEL WITH LOCKING GRATE

Matter enclosed in heavy brackets [ ] appears in the original patent but forms no part of this reissue specification; matter printed in italics indicates the additions made by reissue.

This application is a [continuation-in-part] *continuation* of application Ser. No. 506,245, filed 6/20/83 now abandoned.

TECHNICAL FIELD AND BACKGROUND OF THE INVENTION

This invention relates to a drainage channel having a locking, slotted grate for being positioned in and covering the opening of a drainage channel body. The drainage channel of the general type disclosed herein is preferably cast of polyester concrete. In may cases this type of drainage channel body is installed without anchoring the grate. Subsequent to installation, however, it often becomes desirable or necessary to anchor the grate into the channel body. This operation involves considerable expense and work. The grates must be removed and openings knocked into the longitudinal walls of the channel body in order to insert the ends of a locking strap which is held by a bolt to the grate. Such operations are often hampered by poor visibility as well as by an imprecise geometrical definition of the exact location of the knocked out areas.

Even when the grate is locked into the channel immediately upon installation, most channels simply provide an area of reduced wall thickness which must be knocked out by a workman with a chisel before installation of the channel into the ground. This operation is slow and expensive.

SUMMARY OF THE INVENTION

Therefore, it is an object of the invention to provide a drainage channel which permits precise and simple anchoring of the grate either during or subsequent to installation and which is inexpensive to manufacture.

It is another object of the present invention to provide a drainage channel which permits the grate to be simply and easily removed when necessary for cleaning or repair.

It is yet another object of the present invention to provide a drainage channel which automatically moves into and out of locking position upon rotation of a mounting bolt.

These and other objects and advantages of the present invention are achieved in the preferred embodiment of the product below by providing a drainage channel including an elongate channel body having an upwardly directed opening. A slotted grate is provided for being positioned in and covering the opening of the channel body. Anchor means are provided for detachably securing the grate to the channel body. The anchor means comprise a bolt rotatably mounted on the grate and having an end extending into the channel body and a locking strap carried transversely by the bolt for rotation thereon within the channel body into and out of proximity to the walls of the channel body. A locking block is carried by the walls of the channel body and cooperates with the locking strap. Means are provided for securing the locking strap within the locking block upon rotation of the locking strap in one direction, and for detaching the locking strap from the locking block upon rotation in the other direction. In this way, the grate can be easily and quickly secured to or detached from the channel body, as desired.

Preferably, the locking block comprises a recess which is integrally formed into the channel body. The locking block preferably includes an oblique wall cooperating with the locking strap to permit rotation therepast of the locking strap, and a corner in the locking block for stopping the rotation of the locking strap upon contact therewith.

According to one embodiment of the invention, the anchor includes two of the locking blocks, each one on opposite sides of the channel body in relation to receive the locking strap.

In the particular embodiment of the invention disclosed herein, the grate itself comprises a heavy, solid cast structure.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 1 is a cross-sectional of a drainage channel with the grate anchored in place according to the present invention;

FIG. 2 is a fragmentary perspective view with parts broken away of a drainage channel body with an incorporated locking block molded therein;

FIG. 3 is horizontal cross-sectional view of the channel body wall and locking blocks;

FIG. 4 is a fragmentary perspective view of a drainage channel, grate and anchor means according to the present invention; and, FIG. 5 is a cross-sectional view taken substantially long lines 5/5 of FIG. 4.

DESCRIPTION OF THE PREFERRED EMBODIMENT

Referring now specifically to the drawings, the rainwater drainage channel as shown in FIG. 1 comprises a channel body 1 which has a U-shaped cross-section and upon which a grate 2 is positioned. The grate 2 is anchored into space by means of a detachable anchoring device 3.

Anchoring device 3 comprises a bolt 4 which has a head 13 on one end and threads 14 on the other end. A locking strap having free ends 9, 9' is positioned on bolt 4 and in locking position is perpendicular to longitudinal walls 7, 7'. Bolt 4 is inserted into a recess 15 located approximately in the center of grate 2 and is screwed into a tapped hole 16 which is likewise located approximately in the center of locking strap 5. Each longitudinal wall 7, 7' is cast with two incorporated locking blocks 8,8' which have an approximate H-shaped cross-section. Each locking block 8, 8' has, with reference to the channel body 1, an inside recess 10, 10' and an outside recess 17, 17'.

When installed, free ends 9, 9' of the locking strap 5 engage with the recesses 10, 10', respectively, of the two incorporated locking blocks 8, 8'. Once the bolt 4 is tightened, movement of locking strap 5 toward grate 2 is limited by stops 6.

To install the anchoring device, the locking strap 5 is introduced into the channel body 1 and is then positioned perpendicular to the walls of channel body 1 at the level of locking blocks 8, 8' to permit ends 9, 9' of locking strap 5 to engage with inner recesses 10, 10'. In order to facilitate easy entrance of the ends 9, 9' of locking block 5 into recesses 10, 10', an oblique angle wall 18 is formed in recesses 10, 10'. See FIGS. 2 and 3.

As is shown in FIG. 2, one embodiment of the locking block 8 is cast with longitudinal walls 7 of drainage channel 1. To ensure that locking block 8 is properly anchored within channel body 1, a structure 12 is located within channel body 1 and contains ribs 23 and 24. However, any other appropriate convex or concave variation of the surfaces of locking block 8 could also serve the same purpose.

As is shown in FIG. 3, locking block 8 features a profile which is approximately H-shaped. An outside frame 19 and an inside wall 20 are distinguished. Outer recess 17 of locking block 8 is asymetrical in shape. This prevents the locking block 8 from being inadvertently placed into the mold facing the wrong direction. A base 22 separating inner and outer recesses 17, 17' and 10, 10', respectively, is a suitable surface for an identification marking or for a company name.

Channel body 1 can be manufactured by molding to permit easy installation of locking blocks 8. For this reason, locking blocks 8, 8' are placed onto the mold so that outer recesses 17, 17' each fit onto a locating lobe of the mold. A channel body 1 is then cast into the mold. This process is simple and inexpensive.

The mold is then removed in the usual manner after the material has hardened. Polyester concrete has proven to be a particularly good material for casting the channel bodies 1. However, suitable materials may also be used. The locking blocks 8 may be made of a plastic material such as nylon or PVC, although metal or wood may also be used.

The locking blocks serve two purposes:

First, the plastic protects the concrete walls of the channel body 1 from breaking and crushing caused by tightening the locking strap 5 within the locking blocks 8, 8' and in flexure of the channel structure caused by vertical loading.

Second, the plastic is soft enough to give slightly against the pressure of the metal locking strap 5. Surprisingly, this prevents loosening of the locking strap 5 while nevertheless allowing the locking strap to be tightly bolted into the locking blocks 8, 8'.

A variation of manufacturing the channel body 1 is to insert locking blocks 8, 8' into openings in the channel body 1 after the molding process is complete. The locking blocks 8, 8' may be anchored to the inner surfaces of channel body 1 by using glue or screws.

Referring now to FIGS. 4 and 5, grate 2 will be properly locked with channel body 1 even though only 1 end of the locking strap 5 is positioned against the corner of the locking block. However, by adjusting the longitudinal position of grate 2 within channel body 1, both ends 9, 9' can be positioned against the corresponding corners of locking blocks 8 and 8'. In this position, the locking strap 5 would be slightly out of perpendicular in relation to the walls of channel body 1.

Ordinarily, the locking strap 5 automatically positions itself in locking block 8, 8' as bolt 4 is turned. As bolt 4 is tightened, locking strap 5 is pulled upwardly into contact with the upper walls of locking block 8, 8'.

A drainage channel is described above. Various details of the invention may be changed without departing from its scope. Furthermore, the foregoing description of the preferred embodiment of the drainage channel according to the present invention is provided for the purpose of illustration only and not for the purpose of limitation—the invention being defined by the claims.

I claim:

[1. A drainage channel including an elongate concrete channel body having an upwardly directed opening; a grate for being positioned in and covering the opening of said channel body; and anchor means for detachably securing said grate to said channel body, said anchor means comprising:

(a) a bolt rotatably mounted on said grate and having an end extending into said channel body;

(b) a locking strap carried transversely by said bolt for rotation thereon within said channel body into and out of proximity to the walls of said channel body; and (c) a locking block carried in a recess in the walls of said channel body and cooperating with said locking strap and including means for securing said locking strap within said locking block upon rotation of said locking strap in one direction and for detaching said locking strap from said locking block upon rotation in the other direction whereby said grate can be easily and quickly secured to or detached from said channel body; said locking block comprising an insert positioned in said recess and interposed between the concrete walls of the channel body and locking strap to protect the concrete walls of the channel body from breaking and crushing caused by tightening the locking strap within the locking block and flexure of the channel structure caused by vertical loading of the channel and prevent loosening said locking strap within said locking block.]

[2. A drainage channel according to claim 1 wherein said locking block includes an oblique wall cooperating with said locking strap to permit rotation therepast of said locking strap, and a corner in said locking block for stopping the rotation of said locking strap upon contact therewith.]

[3. A drainage channel according to claim 1 wherein said anchor means includes two of said locking blocks, each one on opposite side walls of said channel body in locking strap receiving relation.]

[4. A drainage channel according to claim 1 wherein said bolt is threaded, and said locking strap has a centrally disposed threaded hole for matingly receiving said bolt.]

[5. A drainage channel according to claim 15 wherein as said bolt is progressively turned to secure said locking strap in said locking block, said locking strap is locked against said corner and upper walls of said locking block whereby said grate is held tightly within said channel body.]

[6. A drainage channel including an elongate channel body having an upwardly directed opening; a grate for being positioned in and covering the opening of said channel body; and anchor means for detachably securing said grate to said channel body, said anchor means comprising:

(a) a threaded bolt rotatably mounted on said grate and having an end extending into said channel body;

(b) a locking strap having a centrally disposed threaded hole for matingly receiving said bolt for rotation thereon within said channel body into and out of proximity to the walls of said channel body;

(c) a locking block carried in a recess in the walls of said channel body and comprising a recess in said channel body having an oblique wall cooperating with said locking strap to permit rotation therepast of said locking strap in one direction, and the walls of said channel body defining a corner in the recess for stopping the rotation of said locking strap and securing said locking strap within said locking block upon rotation thereof in the other direction whereby said grate can be easily and quickly secured to or detached from said channel body; said locking block comprising an insert positioned in said recess and interposed between the concrete walls of the channel body and locking strap to protect the concrete walls of the channel body from breaking and crushing caused by tightening the locking strap within the locking block and flexure of the channel structure caused by vertical loading of the channel and and prevent loosening of said locking strap within said locking block.]

[7. A drainage channel according to claim 6 wherein said anchor means includes two of said locking blocks, one each on opposite side walls of each channel body in locking strap receiving relation.]

[8. A drainage channel according to claim 6 wherein as said bolt is progressively turned to secure said locking strap in said recess, said locking strap is locked against said corner and upper walls of said locking block defining said recess whereby said grate is held tightly within said channel body.]

[9. A drainage channel according to claim 6 wherein said locking block comprises a plastic insert integrally molded into a through hole in said channel body.]

*10. A drainage channel including an elongate channel body formed of a cementious material and having spaced-apart walls defining an upwardly directed opening, a grate for being positioned in and covering the opening of said channel body, and anchor means for detachably securing said grate to said channel body, said anchor means comprising:*

*(a) a bolt rotatably mounted on said grate and having an end extending into said channel body;*

*(b) a locking strap carried transversely by said bolt for rotation thereon within said channel body into and out of proximity to the walls of said channel body; and*

*(c) a locking block carried in a recess in the walls of said channel body and cooperating with said locking strap and including means for securing said locking strap within said locking block upon rotation of said locking strap in one direction and for detaching said locking strap from said locking block upon rotation in the other direction whereby said grate can be easily and quickly secured to or detached from said channel body, said locking block comprising an insert positioned in said recess and interposed between the walls of the channel body and locking strap.*

*11. A drainage channel according to claim 10 wherein said locking block includes an oblique wall cooperating with said locking strap to permit rotation therepast of said locking strap, and a corner in said locking block for stopping the rotation of said locking strap upon contact therewith.*

*12. A drainage channel according to claim 10 wherein said anchor means includes two of said locking blocks, each one on opposite side walls of said channel body in locking strap receiving relation.*

*13. A drainage channel according to claim 10 wherein said bolt is threaded, and said locking strap has a centrally disposed threaded hole for matingly receiving said bolt.*

14. A drainage channel according to claim 10 wherein as said bolt is progressively turned to secure said locking strap in said locking block, said locking strap is locked against said corner and upper walls of said locking block whereby said grate is held tightly within said channel body.

*15. A drainage channel including an elongate channel body formed of a cementious material and having spaced-apart walls defining an upwardly directed opening, a grate for being positioned in and covering the opening of said channel body, and anchor means for detachably securing said grate to said channel body, said anchor means comprising:*

*(a) a threaded bolt rotatably mounted on said grate and having an end extending into said channel body;*

*(b) a locking strap having a centrally disposed threaded hole for matingly receiving said bolt for rotation thereon within said channel body into and out of proximity to the walls of said channel body; and*

*(c) a locking block carried in a recess in the walls of said channel body and comprising a recess in said channel body having an oblique wall cooperating with said locking strap to permit rotation therepast of said locking strap in one direction, and the walls of said channel body defining a corner in the recess for stopping the rotation of said locking strap and securing said locking strap within said locking block upon rotation thereof in the other direction whereby said grate can be easily and quickly secured to or detached from said channel body, said locking block comprising an insert positioned in said recess and interposed between the walls of the channel body and locking strap.*

*16. A drainage channel according to claim 15 wherein said anchor means includes two of said locking blocks, one each on opposite side walls of each channel body in locking strap receiving relation.*

*17. A drainage channel according to claim 15 wherein as said bolt is progressively turned to secure said locking strap in said recess, said locking strap is locked against said corner and upper walls of said locking block defining said recess whereby said grate is held tightly within said channel body.*

*18. A drainage channel according to claim 15 wherein said locking block comprises a plastic insert integrally molded into a through hole in said channel body.*

* * * * *